United States Patent
Park

(10) Patent No.: US 10,042,783 B2
(45) Date of Patent: Aug. 7, 2018

(54) HOST DEVICE, COMPUTING SYSTEM INCLUDING THE SAME AND A PLURALITY OF DEVICES, INTERFACE LINK LAYER CONFIGURATION METHOD THEREOF

(71) Applicant: Samsung Electronics Co., Ltd., Suwon-si, Gyeonggi-do (KR)

(72) Inventor: Hyuntae Park, Suwon-si (KR)

(73) Assignee: Samsung Electronicns Co., Ltd., Gyeonggi-do (KR)

( * ) Notice: Subject to any disclaimer, the term of this patent is extended or adjusted under 35 U.S.C. 154(b) by 253 days.

(21) Appl. No.: 15/000,243

(22) Filed: Jan. 19, 2016

(65) Prior Publication Data
US 2016/0274821 A1 Sep. 22, 2016

(30) Foreign Application Priority Data
Mar. 20, 2015 (KR) .......... 10-2015-0039038

(51) Int. Cl.
G06F 3/06 (2006.01)
G06F 13/10 (2006.01)

(52) U.S. Cl.
CPC .......... *G06F 13/102* (2013.01); *G06F 3/0658* (2013.01); *Y02D 10/14* (2018.01)

(58) Field of Classification Search
CPC ...... G06F 3/067; G06F 3/0689; G06F 3/0607; G06F 3/0659; G06F 3/0679; G06F 3/0635
USPC .......................................................... 710/74
See application file for complete search history.

(56) References Cited

U.S. PATENT DOCUMENTS

| | | | |
|---|---|---|---|
| 6,671,758 B1 | 12/2003 | Cam et al. | |
| 6,868,461 B1 | 3/2005 | Mirkhani et al. | |
| 7,171,500 B2 | 1/2007 | Day et al. | |
| 7,679,133 B2 | 3/2010 | Son et al. | |
| 8,180,931 B2 | 5/2012 | Lee et al. | |
| 8,301,822 B2 | 10/2012 | Pinto et al. | |
| 8,533,300 B2 * | 9/2013 | Ando | H04L 61/2038 709/220 |
| 8,549,205 B1 | 10/2013 | Harriman et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,699,953 B2 | 4/2014 | Badi et al. | |
| 8,874,820 B2 | 10/2014 | Oh et al. | |
| 8,924,620 B2 | 12/2014 | Harriman et al. | |
| 9,026,854 B2 | 5/2015 | Jeong et al. | |
| 9,329,781 B2 * | 5/2016 | Chikusa | G06F 3/061 |

(Continued)

OTHER PUBLICATIONS

Universal Flash Storage Association—"Introduction to the Universal Flash Storage Assocation"; 11 pages, Dated 2013 (Year: 2013).*

*Primary Examiner* — Brian T Misiura
(74) *Attorney, Agent, or Firm* — Harness, Dickey & Pierce, P.L.C.

(57) ABSTRACT

A computing system includes a first storage device, a second storage device, and a host device configured to communicate with the first storage device and the second storage device according to a communication protocol, wherein the host device includes an interconnection layer to assign physical ports for connection between the host device and the first storage device and the second storage device, in order to simultaneously process transactions for the first storage device and the second storage device.

18 Claims, 11 Drawing Sheets

(56) References Cited

U.S. PATENT DOCUMENTS

| | | | |
|---|---|---|---|
| 9,477,620 B2* | 10/2016 | Kim | G06F 13/28 |
| 2007/0174522 A1 | 7/2007 | Lee | |
| 2011/0072185 A1* | 3/2011 | Pinto | G06F 3/0607 |
| | | | 710/315 |
| 2011/0233648 A1 | 9/2011 | Seol et al. | |
| 2013/0054847 A1 | 2/2013 | Cho et al. | |
| 2013/0275640 A1 | 10/2013 | Wang et al. | |
| 2014/0089553 A1 | 3/2014 | Ma | |
| 2014/0281072 A1 | 9/2014 | Yang et al. | |
| 2015/0160880 A1* | 6/2015 | Jang | G06F 3/0625 |
| | | | 711/103 |
| 2015/0177986 A1* | 6/2015 | Kondo | G06F 13/385 |
| | | | 711/103 |
| 2016/0202921 A1* | 7/2016 | Jeong | G06F 3/0614 |
| | | | 710/313 |
| 2016/0216908 A1* | 7/2016 | Kim | G06F 3/0652 |
| 2016/0274923 A1* | 9/2016 | Harriman | G06F 1/3203 |

* cited by examiner

HOST DEVICE, COMPUTING SYSTEM INCLUDING THE SAME AND A PLURALITY OF DEVICES, INTERFACE LINK LAYER CONFIGURATION METHOD THEREOF

CROSS-REFERENCE TO RELATED APPLICATIONS

This U.S. non-provisional patent application claims the benefit of priority under 35 USC § 119 to Korean Patent Application No. 10-2015-0039038, filed on Mar. 20, 2015, the disclosure of which is hereby incorporated in its entirety by reference.

BACKGROUND

Field

Example embodiments of the inventive concepts relate to a host device, a computing system including the host device and a plurality of devices, and an interface link layer configuration method of the host device.

Description of Related Art

Various types of electronic devices are used today that solely performs its own unique functions. Furthermore, an electronic device may perform its own unique function while exchanging data with an another electronic device. An interface technology is used to exchange data between two electronic devices. As various types of electronic devices have emerged, the types of interface protocols have been diversified.

In recent years, Mobile Industry Processor Interface (MIPI) Alliance has proposed an interface protocol using "UniPro" as a link layer to unify the interfacing procedure of a mobile device. The "UniPro" supports a physical layer, so-called "PHY". An electronic device performing interfacing using UniPro and PHY includes a transmitter and a receiver to exchange data with another electronic device. A transmitter included in one electronic device, and a receiver included in another electronic device connected to the transmitter constitutes a single lane.

SUMMARY

Example embodiments of the inventive concepts relate to a host device, a computing system including the host device, and a method of configuring a link layer supporting the host device.

Example embodiments of the inventive concepts provide a computing system. The computing system may include: a first storage device; a second storage device; and a host device configured to communicate with the first and the second storage devices according to the same communication protocol. The host may include an interconnection layer to assign physical ports for connection between the first and the second storage devices to corresponding transactions, in order to simultaneously process transactions for the first and the second storage devices.

In example embodiments of the inventive concepts, the first and the second storage devices may be homogeneous storage devices.

In example embodiments of the inventive concepts, the first and the second storage devices may be heterogeneous storage devices.

In example embodiments of the inventive concepts, the interconnection layer may assign a priority to the first and the second storage devices using a traffic class.

In example embodiments of the inventive concepts, the interconnection layer may include a data link layer to add corresponding physical channel information or a traffic class to a packet input from an upper layer to generate a frame.

In example embodiments of the inventive concepts, the interconnection layer may further include a physical adapter layer to receive the frame and add physical port information to generate a physical adapter level transaction unit.

In example embodiments of the inventive concepts, the interconnection layer may include a plurality of physical layers to receive the physical adapter level transaction unit to generate symbols transmittable to physical layers of the first and the second storage devices.

In example embodiments of the inventive concepts, the communication protocol may be a universal flash storage (UFS) protocol.

In example embodiments of the inventive concepts, the plurality of physical layers may include: first physical layers to form two lanes connected to the first storage device; and second physical layers to form two lanes connected to the second storage device.

In example embodiments of the inventive concepts, the host device may further include a transport layer to receive the transactions from an application layer to generate a corresponding packet using device connection ports corresponding to the first and the second storage devices.

In example embodiments of the inventive concepts, the host device may further include a network layer to route a port generated at the transport layer.

In example embodiments of the inventive concepts, the first storage device may be an embedded UFS, and the second storage device may be a UFS card.

In example embodiments of the inventive concepts, the host may preferentially process the quality of service (QoS) of the embedded UFS ahead of the QoS of the UFS card.

In example embodiments of the inventive concepts, the host device may be an application processor or a modem-integrated application.

In example embodiments of the inventive concepts, at least one of the first and second storage devices may be a vertical NAND (VNAND) flash memory device.

Example embodiments of inventive concepts provide a host device having a universal flash storage (UFS) interface. The UFS interface may include: an interconnection layer to transmit/receive a frame to/from the first and the second storage devices according to a UFS protocol; and a host controller interface to deconstruct the transmitted/received frame into a packet or construct the transmitted/received frame. The interconnection layer may include: a link layer to assign a physical port to which the first and second devices are connected and a corresponding traffic class to a packet generated from the host controller interface; first physical layers to receive a frame from the link layer to generate symbols transmitted/received to/from the first storage device; and second physical layers to receive a frame from the link layer to symbols transmitted/received to/from the first storage device.

In example embodiments of the inventive concepts, different physical port numbers may be assigned to the first and second physical layers, respectively.

In example embodiments of the inventive concepts, the first and the second storage devices may be classified at one or more upper layers of the link layer by the traffic class.

In example embodiments of the inventive concepts, the first and the second storage devices may be classified at one or more lower layers of the link layer by the traffic class.

Example embodiments of inventive concepts provide a link layer configuration method of a universal flash storage (UFS) interface. The link layer configuration method may include: classifying storage devices using physical ports to which the storage devices are connected; and assigning a priority to each of the storage devices using a traffic class.

BRIEF DESCRIPTION OF THE DRAWINGS

The forgoing and other features will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
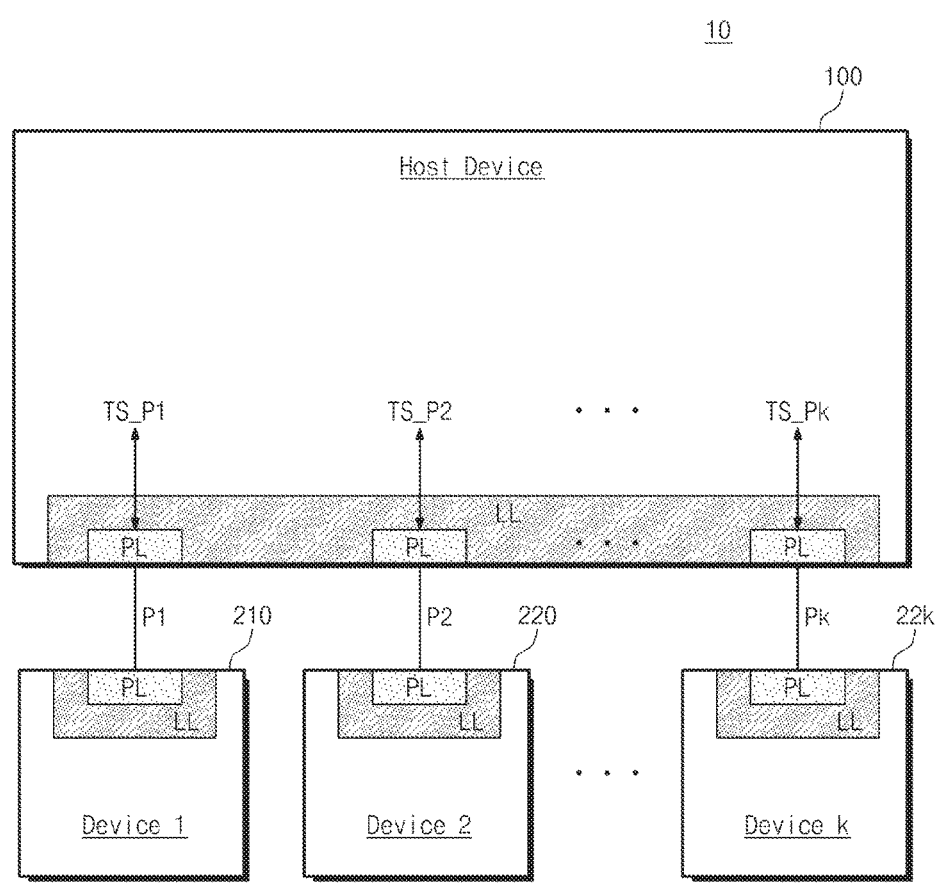
FIG. 1 illustrates a computing system according to example embodiments of the inventive concepts.

Hereinafter, the example embodiments of the inventive concepts will be described clearly and in detail with reference to the accompanying drawings so that they may be easily practiced by those skilled in the art.

Various modifications and several shapes are possible in various example embodiments of the inventive concepts, and specific example embodiments are illustrated in drawings, and related detailed descriptions are listed. However, the inventive concepts are not intended to be limited to the specific example embodiments, and it is understood that it should include all modifications, equivalents, and substitutes within the scope and technical range of the inventive concepts. It will be understood that, although the terms such as "1st", "2nd", "first", "second", and the like may be used herein to describe various elements, the elements should not be limited by these terms. These terms are used to distinguish one element from another element. For example, a first element may be referred to as a second element and vice versa without departing from the scope of the present disclosure. It will be understood that when an element is referred to as being "connected to" or "coupled to" another element, it may be directly connected or coupled to the other element or intervening elements may be present. In contrast, when an element is referred to as being "directly connected to" or "directly coupled to" another element, it should be understood that there are no intervening elements. Other expressions for expressing relations between elements, such as "between" and "directly between" or "adjacent to" and "directly adjacent to", should be also interpreted should be interpreted in a like fashion. As used herein, the term "and/or" includes any and all combinations of one or more of the associated listed items and may be abbreviated as "/".

Terms used in this specification are used to describe specified example embodiments of the inventive concepts, and are not intended to limit the scope of the inventive concepts. The terms of a singular form may include plural forms unless otherwise specified. It should be understood that the term "include", "comprise", "have", "including", "comprising", or "having" used herein specifies the presence of stated features, integers, steps, operations, elements, components, or combinations thereof but does not preclude the presence of addition of one or more other features, integers, steps, operations, elements, components, or combination thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various example embodiments of the inventive concepts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 illustrates a computing system 10 according to example embodiments of the inventive concepts. As illustrated, the computing system 10 includes a host device 100 and devices 210, 220, . . . , and 22k (k being an integer greater than or equal to 2) connected to the host device 100. The computing system 10 may be one of various electronic devices such as a computer, a laptop computer, a mobile phone, a digital camera, a memory card reader, an interface hub, and a tablet PC.

The host device 100 controls the overall operation of the computing system 10. In example embodiments of the inventive concepts, the host device 100 may be including but not limited to, at least one processor, an application processor, a modem-integrated application processor or the like.

Each of the storage devices 210, 220, . . . , and 22k may receive/transmit data from/to the host device 100 through the same communication protocol, and perform various functions. Each of the storage devices 210, 220, . . . , and 22k may be a certain device, such as a communication chip, an image sensor, a display device, and a storage device (a memory, a card, etc.), which transmits and receives data through communication.

In example embodiments of the inventive concepts, the communication protocol may be a serial communication protocol. For example, the serial communication protocol may be implemented with at least one of UART (universal asynchronous receiver/transmitter) I2C (inter-integrated circuit), SPI (serial peripheral interconnect), USB (universal serial bus), HPMI (high definition multimedia interface), MHL (mobile high definition link), MIPI (mobile industry processer interface), MDDI (mobile display digital interface), MVI (mobile video interface), NVMe (non-volatile memory express), PCIe (peripheral component interconnect express), SATAe (serial advanced technology attachment express), SAS (serial attached SCSI (small computer system interface)), and LLI (low latency interface).

In example embodiments of the inventive concepts, the storage devices 210, 220, ..., and 22k may be connected to the host device 100 through physical ports P1, P2, ..., and Pk (e.g., "wire ports"). In particular, each of the storage devices 210, 220, ..., and 22k may use information (e.g., port number) associated with the physical ports P1, P2, ..., and Pk when communicating with the host device 100. That is, the physical protocol may be implemented to perform communication using physical port information. In particular, the communication protocol according to example embodiments of the inventive concepts may distinguish/divide/classify the devices 210, 220, ..., and 22k based on the physical port information at not only a layer below a link layer LL (e.g., physical layer PL) but also a layer above the link layer LL (e.g., a link layer, a network layer or a transport layer).

In example embodiments of the inventive concepts, the host device 100 may independently/individually process transactions TS_P1, TS_P2, ..., and TS_Pk of the devices 210, 220, ..., and 22k divided based on the physical port information as zero. The transactions TS_P1, TS_P2, ..., and TS_Pk may include physical port information to which the devices 210, 220, ..., and 22k are connected, respectively.

A conventional computing system must include different link layers to execute transactions associated with different devices that are used at the same time although using the same communication protocol. Accordingly, problems arise on chip size and power consumption of another host device. Meanwhile, the computing system 10 according to example embodiments of the inventive concepts may independently process transactions associated with devices according to a communication protocols using physical port information to integrate link layers into one. Thus, the computing system 10 may overcome the chip size and power consumption problems of the conventional computing system.

Figure 2:
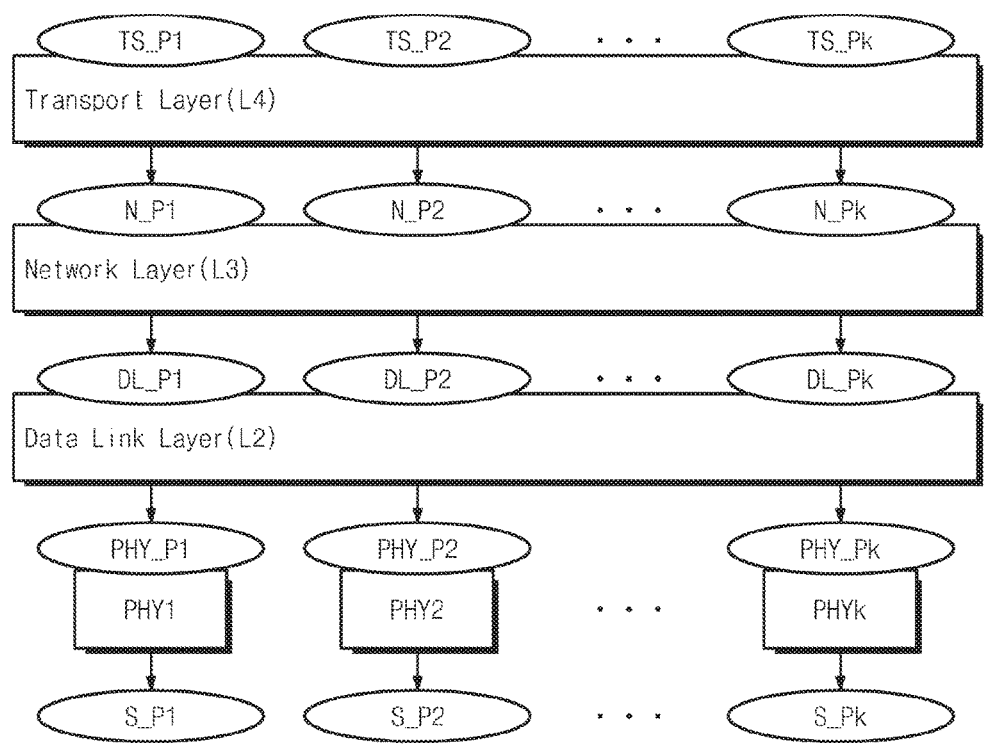
FIG. 2 is a block diagram illustrating a layer structure of a communication protocol according to example embodiments of the inventive concepts.

FIG. 2 is a block diagram illustrating a layer structure of a communication protocol according to example embodiments of the inventive concepts. As illustrated, the communication protocol includes a transport layer L4, a network layer L3, a data link layer L2, and physical layers PHY1, PHY2, ..., and PHYk. For brevity of description, a data flow from the host device 100 to storage devices 210 and 220 will be described in FIG. 2.

The transport layer L4 may receive transactions TS_P1, TS_P2, ..., and TS_Pk to control devices 210, 220, ..., and 22k and generate packages N_P1, N_P2, ..., and N_Pk suitable for the devices 210, 220, ..., and 22k. In example embodiments of the inventive concepts, the transactions TS_P1, TS_P2, ..., and TS_Pk may include physical port information P1, P2, ..., and Pk to which the devices 210, 220, ..., and 22k are connected, respectively. In example embodiments of the inventive concepts, each of the packets N_P1, N_P2, ..., and N_Pk may include a header, a payload having data and/or a command, and a code value for error correction. In example embodiments of the inventive concepts, a header may include command type information, a device identification number DevID, a network identification number NetID, physical port information P1, P2, ..., and Pk, and the like.

The network layer L3 performs routing to select a transport path to packets N_P1, N_P2, ..., and N_Pk of the transport layer L4. In example embodiments of inventive concepts, the network layer L3 may perform routing by not using a specific address like a typical network layer but using the physical port information P1, P2, ..., and Pk. For example, the network layer L3 may generate routed packets DL_P1, DL_P2, ..., and DL_Pk according to physical port information corresponding to the devices 210, 220, ..., and 22k. The transport layer L4 and the network layer L3 may be collectively called a transaction layer TL.

The data link layer L2 may receive the routed packets DL_P1, DL_P2, ..., and DL_Pk and perform access control, flow control or error checking of each of the devices 210, 220, ..., and 22k. The data link layer L2 may divide/classify a physical channel PA_SAP to classify the devices 210, 220, ..., and 22k. The data link layer L2 may generate frames PHY_P1, PHY_P2, ..., and PHY_Pk where physical channel information is added to the routed packets DL_P1, DL_P2, ..., and DL_Pk.

The physical layers PHY1, PHY2, ..., and PHYk may receive the frames PHY_P1, PHY_P2, ..., and PHY_Pk and convert the received frames PHY_P1, PHY_P2, ..., and PHY_Pk into symbols S_P1, S_P2, ..., and S_Pk transportable to physical layers of the devices 210, 220, ..., and 22k, respectively. In example embodiments of the inventive concepts, the symbols S_P1, S_P2, ..., and S_Pk may include physical port information to which the devices 210, 220, ..., and 22k are connected, respectively.

A communication protocol according to example embodiments of the inventive concepts may use physical port information to identify the devices 210, 220, ..., and 22k.

On the other hand, a communication protocol according to example embodiments of the inventive concepts may assign a traffic class to each device to perform preferential processing.

Figure 3:
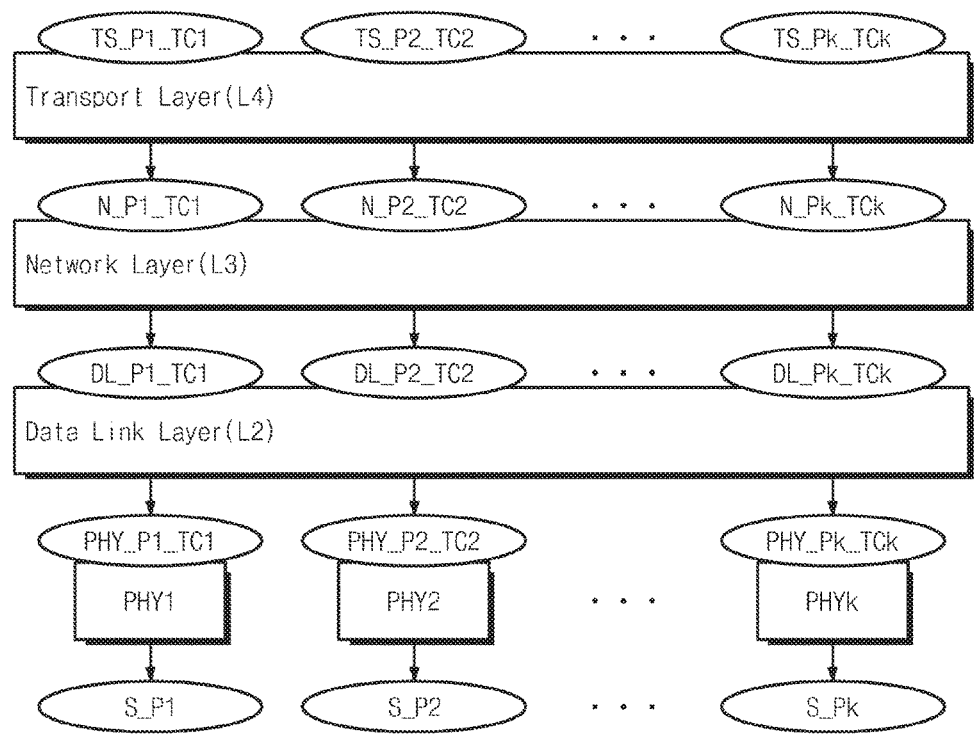
FIG. 3 is a block diagram illustrating another layer structure of a communication protocol according to example embodiments of the inventive concepts.

FIG. 3 is a block diagram illustrating another layer structure of a communication protocol according to example embodiments of the inventive concepts. As compared to the communication protocol in FIG. 2, the protocol communication in FIG. 3 may assign a traffic class to each device.

A transport layer L4 may receive priority-assigned transactions TS_P1_TC1, TS_P1_TC2, ..., and TS_Pk_TCk and generate packets N_P1_TC1, N_P2_TC2, ..., and N_Pk_TCk suitable for devices 210, 220, ..., and 22k.

A network layer L3 may perform routing to select a transport path to the packets N_P1_TC1, N_P2_TC2, ..., and N_Pk_TCk to generate routed packets DL_P1_TC1, DL_P2_TC2, ..., and DL_Pk_TCk.

A data link layer L2 may receive the routed packets DL_P1_TC1, DL_P2_TC2, ..., and DL_Pk_TCk and perform access control, flow control or error checking of each of the devices 210, 220, ..., and 22k. In example embodiments of the inventive concepts, the data link layer L2 may preferentially process the routed packets DL_P1_TC1, DL_P2_TC2, ..., and DL_Pk_TCk according to the traffic class.

The data link layer L2 may generate frames PHY_P1_TC1, PHY_P2_TC2, . . . , and PHY_Pk_TCk where physical channel information is added to the routed packets DL_P1_TC1, DL_P2_TC2, . . . , and DL_Pk_TCk.

The physical layers PHY1, PHY2, . . . , and PHYk may receive the frames PHY_P1_TC1, PHY_P2_TC2, . . . , and PHY_Pk_TCk and convert the received frames PHY_P1_TC1, PHY_P2_TC2, . . . , and PHY_Pk_TCk into symbols S_P1, S_P2, . . . , and S_Pk transportable to physical layers of the devices 210, 220, . . . , and 22k, respectively.

A communication protocol according to example embodiments of the inventive concepts may use physical port information to identify the devices 210, 220, . . . , and 22k and assign a priority to service of each of the devices 210, 220, . . . , and 22k using a traffic class.

On the other hand, a communication protocol may further include a physical adapter layer between a data link layer and a physical layer to manage a data symbol and power.

Figure 4:
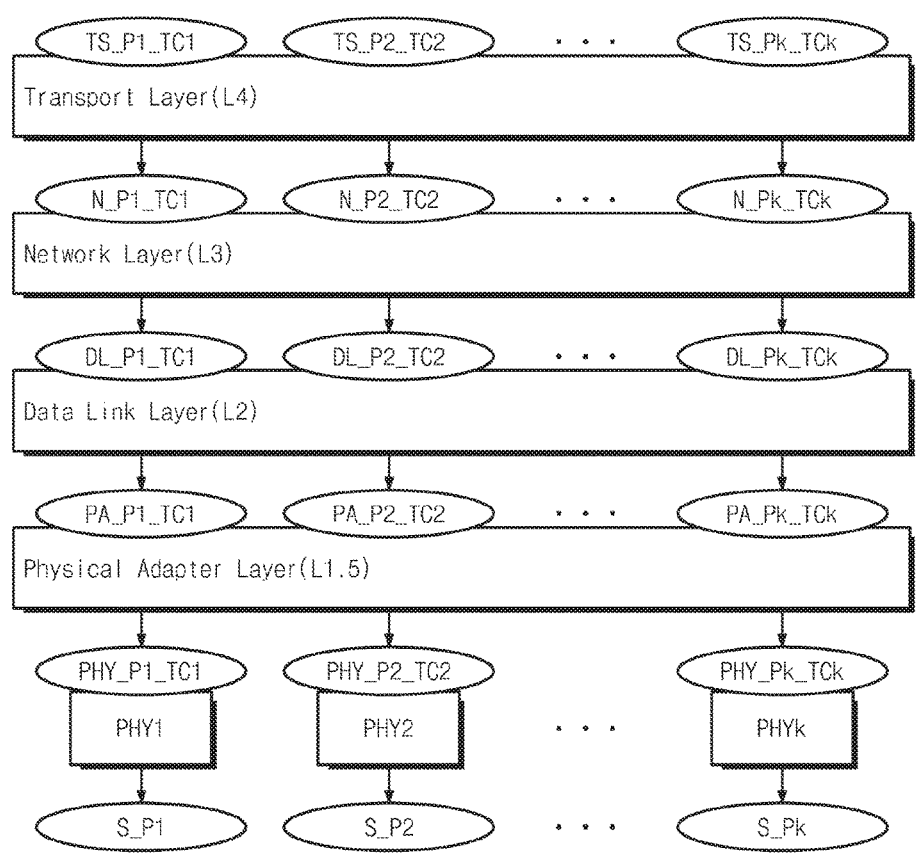
FIG. 4 is a block diagram illustrating another layer structure of a communication protocol according to example embodiments of the inventive concepts.

FIG. 4 is a block diagram illustrating another layer structure of a communication protocol according to example embodiments of inventive concepts. As compared to the communication protocol in FIG. 3, the communication protocol in FIG. 4 further includes a physical adapter layer L1.5 between a data link layer L2 and physical layers PHY1, PHY2, . . . , and PHYk.

The physical adapter layer L1.5 may receive frames PA_P1_TC1, PA_P2_TC2, . . . , and PA_Pk_TCk and may generate physical adapter level transaction units PHY_P1_TC1, PHY_P2_TC2, . . . , and PHY_Pk_TCk where physical port information is added to the frames PA_P1_TC1, PA_P2_TC2, . . . , and PA_Pk_TCk. The data link layer L2 and the physical adapter layer L1.5 may be collectively called a link layer L1.

At least two of the devices 210, 220, . . . , and 22k described in FIGS. 1 to 4 may be storage devices to store data.

Figure 5:
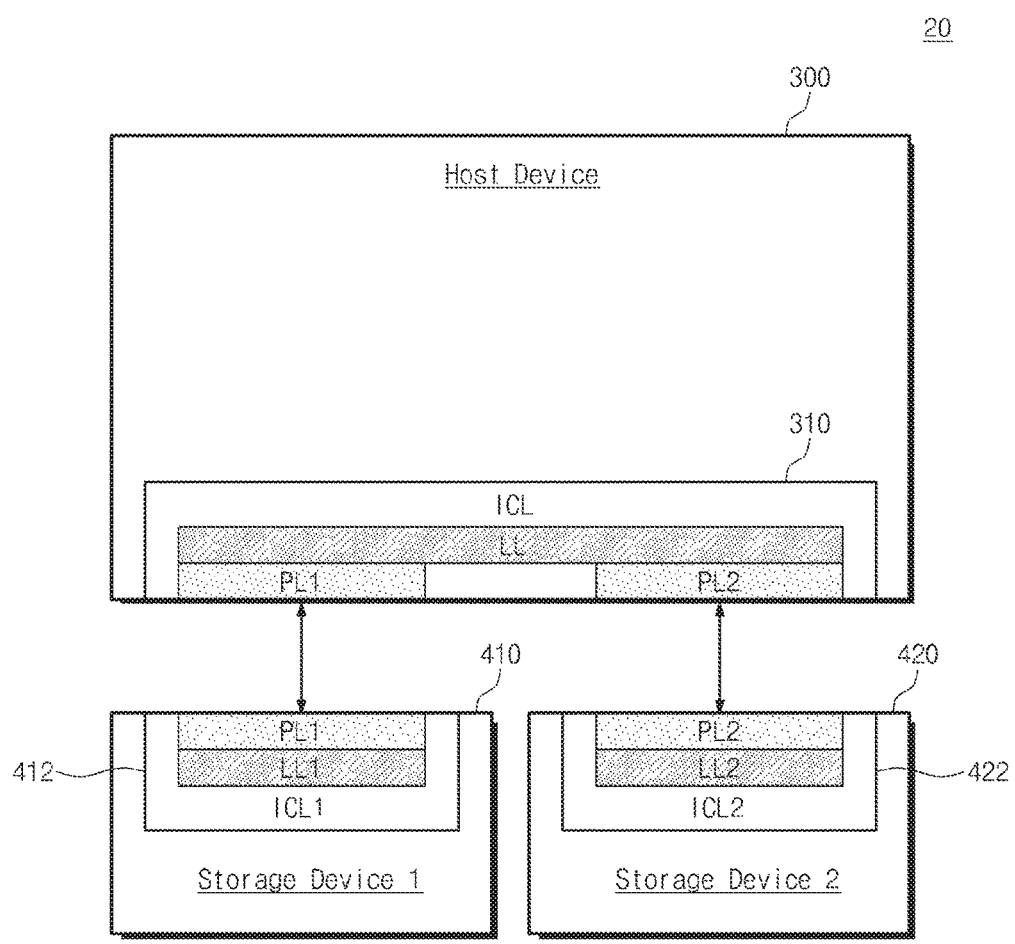
FIG. 5 illustrates a computing system including storage devices.

FIG. 5 illustrates a computing system 20 including storage devices 410 and 420. As illustrated in FIG. 5, the computing system 20 includes a host device 300 and the storage devices 410 and 420.

The host device 300 may include an interconnection layer (ICL) 310. In example embodiments of the inventive concepts, the host device 300 may include but not limited to a mobile-only application processor, a modem-integrated application processor, or the like. The interconnection layer 310 may control communication with the storage devices 410 and 420. In particular, the interconnection layer 310 may manage command re-execution without intervention of a processor (not shown) of the host device 300. The interconnection layer 310 may include a first physical layer PL1, a second physical layer PL2, and a link layer LL.

The first physical layer PL1 may be connected to a physical layer PL1 of the first storage device 410 via at least one first port P1, and the second physical layer PL2 may be connected to a physical layer PL2 of the second storage device 420 via at least one second port P2. Each of the physical layers PL1 and PL2 may include at least one transmitter to transmit data and at least one receiver to receive data.

The link layer LL may manage deconstruction and/or reconstruction of a packet (including a header, a payload, CRC, ECC, etc.) generated at a transport layer (or called "transaction layer") or manage integrity or an error of data. The link layer LL may control a flow for simultaneous data transmission between the host device 300 and the storage devices 410 and 420. That is, the link layer LL may monitor or adjust data transmission. The link layer LL may further include a physical adapter layer.

In particular example embodiments, the link layer LL may divide/classify the first and second physical layers PL1 and PL2 using physical port information, which means that the link layer LL may divide/classify the storage devices 410 and 420 connected to the first and the second physical layers PL1 and PL2. The link layer may assign a priority to each of the storage devices 410 and 420 using a traffic class.

The storage devices 410 and 420 may include interconnection layers 412 and 422, respectively. The interconnection layers 412 and 422 may include physical layers PL1 and PL2 and link layers LL1 and LL2 according to the same communication protocol to communicate with the host device 300, respectively. The communication protocol may have the same configuration as that described in FIGS. 1 to 4.

In example embodiments of the inventive concepts, the storage devices 410 and 420 may be homogeneous storage devices. Alternatively, the storage devices 410 and 420 may be heterogeneous storage devices. For example, each of the storage devices 410 and 420 may be implemented with one of a hard disk drive (HDD), a solid state drive (SSD) including a nonvolatile memory device, an embedded multimedia card (eMMC), a secure digital (SD) card, a micro SD card, a mini SD card, and a universal flash storage (UFS).

As described in FIG. 5, two storage devices 410 and 420 performing communication according to the same communication protocol are connected to the host device 300. However, example embodiments of the inventive concepts are not limited thereto. Three or more storage devices performing communication according to the same communication protocol may be connected to the host device 400. In example embodiments of the inventive concepts, the communication protocol may be a point-to-point connectable communication protocol. For example, the communication protocol may be a certain type of serial communication protocol such as a universal flash storage (UFS) protocol, NVMe, PCLe, and a low latency interface (LLI).

A conventional computing system must separately have an interconnection layer configuration for respective devices to independently process the devices, which may cause an area and power consumption to increase. Meanwhile, the computing system 20 according to example embodiments of the inventive concepts includes the interconnection layer 310 including a single link layer LL to divide/classify physical layers PL1 and PL2 according to storage devices, which may cause an area and power consumption to decrease as compared to the conventional computing system.

On the other hand, the interconnection layer 310 according to example embodiments of the inventive concepts may be applied to a universal flash storage (UFS) interface.

Figure 6:
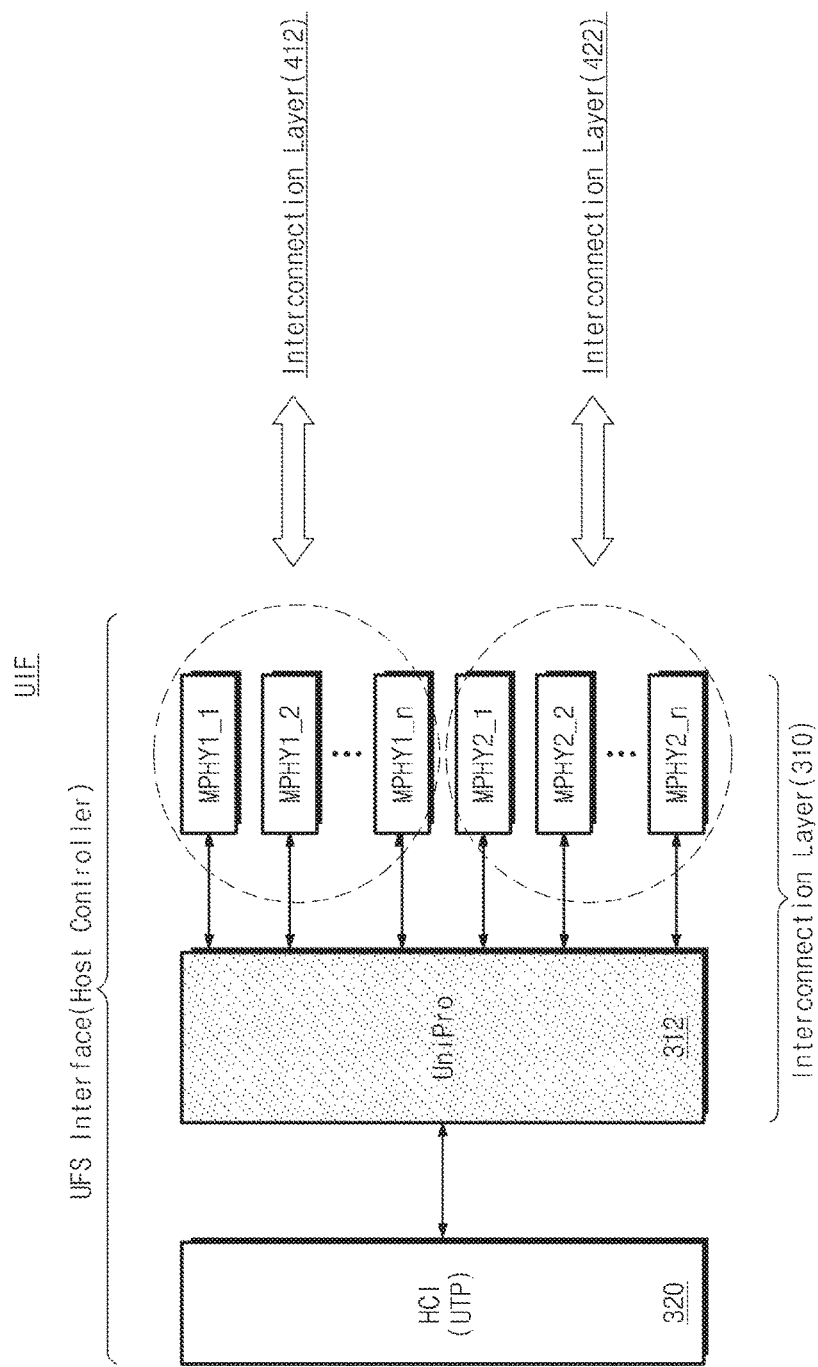
FIG. 6 illustrates a UFS interface of a host device according to example embodiments of the inventive concepts.

FIG. 6 illustrates a UFS interface (UIF) of the host device 300 according to example embodiments of the inventive concepts. As illustrated, the UFS interface of the storage device 300 includes an interconnection layer 310 and a host controller interface (HCI) 320.

The interconnection layer 310 includes a link layer (UniPro) 312 and a plurality of physical layers MPHY1_1, MPHY1_2, . . . , MPHY1_n, MPHY2_1, MPHY2_2, . . . , and MPHY2_n (n being an integer greater than or equal to 2), as shown in FIG. 6.

The link layer 312 may be implemented with the data link layer L2 described in FIGS. 2 and 3 and may be implemented with the data link layer L2 and the physical adapter layer L1.5 described in FIG. 4.

Each of the physical layers MPHY1_1, MPHY1_2, ..., MPHY1_n, MPHY2_1, MPHY2_2, ..., and MPHY2_n may be implemented with the physical layer PL shown in FIGS. 2, 3, and 4.

The first physical layers MPHY1_1, MPHY1_2, ..., and MPHY1_n may be connected to physical layers of the first storage device 410 via a plurality of physical ports. In example embodiments, the first physical layers MPHY1_1, MPHY1_2, ..., and MPHY1_n may be used to form at least one lane between the host device 300 and the first storage device 410.

In example embodiments of the inventive concepts, one of first physical layers MPHY1_1, MPHY1_2, ..., and MPHY1_n may be used as a main physical layer and another may be used as a sub-physical layer. Alternatively, one of first physical layers MPHY1_1, MPHY1_2, ..., and MPHY1_n may be used as a transmission-only physical layer and another may be used as a reception-only physical layer.

The second physical layers MPHY2_1, MPHY2_2, ..., and MPHY2_n may be connected to physical layers of the second storage device 210 via a plurality of physical ports. In example embodiments, each of the second physical layers MPHY2_1, MPHY2_2, ..., and MPHY1_n may have the same configuration as each of first physical layers MPHY1_1, MPHY1_2, ..., and MPHY1_n.

In example embodiments of the inventive concepts, the first and the second storage devices 410 and 420 may be classified using physical port information at one or more upper layers (e.g., a transport layer, a network layer, an application layer, etc.) of the link layer 312. In example embodiments of the inventive concepts, the first and the second storage devices 410 and 420 may be classified using physical port information at a lower layer (e.g., a physical layer or the like) of the link layer 312. The link layer 312 may assign a processing priority according to a traffic class of the storage devices 410 and 420.

The host controller interface 320 is a type of a transport layer and is a UFS transport protocol layer (UTP) in the UFS specification. The host controller interface 320 may include the transport layer L4 and the network layer L3 shown in FIGS. 2, 3, and 4.

Figure 7:
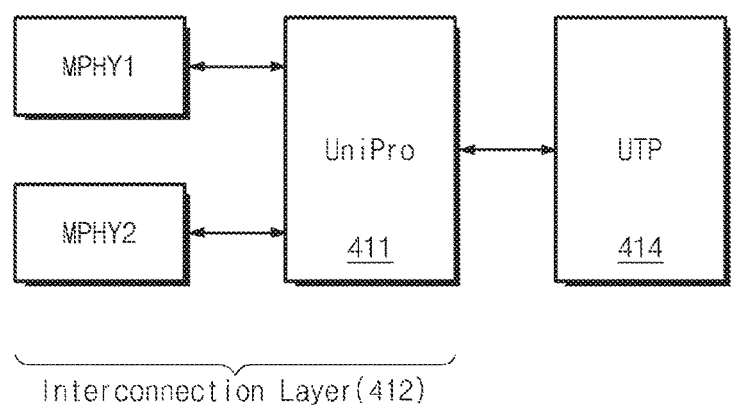
FIG. 7 illustrates a UFS interface of a storage device according to example embodiments of the inventive concepts.

FIG. 7 illustrates a UFS interface (UIF) of a storage device 410 according to example embodiments of the inventive concepts. As illustrated, the UFS interface of the storage device 410 includes an interconnection layer 412 and a transport layer (UTP) 414.

The interconnection layer 412 includes a link layer (Uni-Pro) 411 and a plurality of physical layers MPHY1 and MPHY2. The link layer 411 may be implemented with the data link layer L2 and/or the physical adapter layer L1.5 described in FIGS. 2 to 4.

The physical layers MPHY1 and MPHY2 may be connected to first physical layers MPHY1_1 and MPHY1_2 of a host 300 device, respectively. For brevity of description, an example will be described where the host device 300 and the storage device 410 are connected to two physical layers MPHY1 and MPHY2. Each of the physical layers MPHY1 and MPHY2 may be implemented with the physical layer PHY shown in FIGS. 2 to 4. The transport layer 414 may be implemented with the transport layer L4 and the network layer L3 described in FIGS. 2 to 4.

Figure 8:
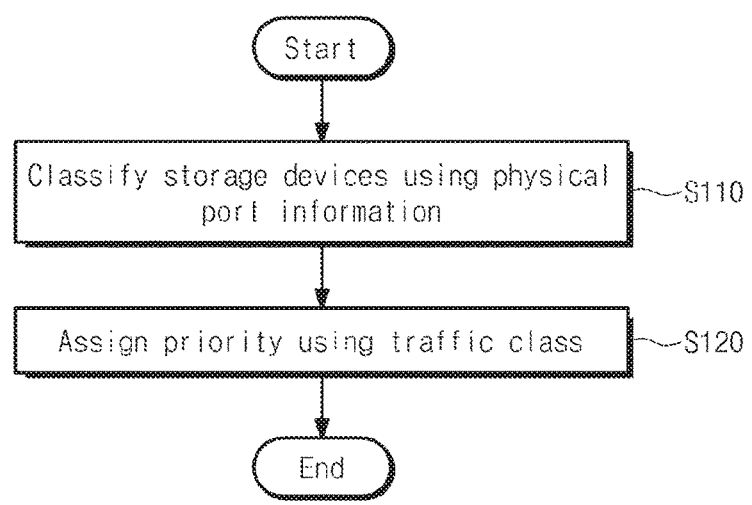
FIG. 8 is a flowchart summarizing a link layer configuration method according to example embodiments of the inventive concepts.

FIG. 8 is a flowchart summarizing a link layer configuration method according to example embodiments of the inventive concepts. Referring to FIGS. 5 to 8, the link layer L2 classifies the storage devices 410 and 420 using physical port information to which the storage devices 410 and 420 are connected (S110). The link layer L2 assigns a priority to a service of each of the storage devices 410 and 420 using a traffic class (S120).

According to the above-described link layer configuration method, storage devices may be classified using physical port information and a service priority of each of the storage devices may be assigned using a traffic class.

Figure 9:
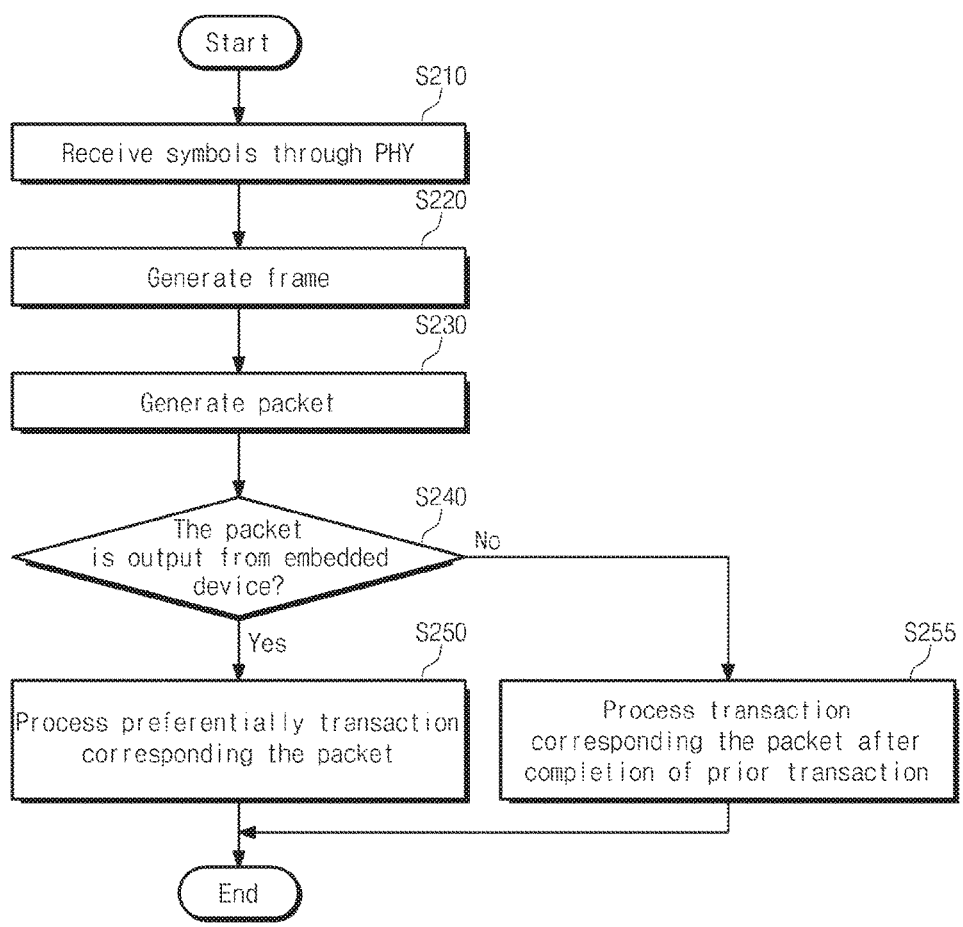
FIG. 9 is a flowchart summarizing a transaction processing method of a host device according to example embodiments of the inventive concepts.

FIG. 9 is a flowchart summarizing a transaction processing method of the host device 300 according to example embodiments of the inventive concepts. The transaction processing method will now be described with reference to FIGS. 5 to 9.

The host device 300 receives symbols through the physical layer PL1 (see FIG. 5) connected to, for example, the storage device 410 (S210). The link layer L2 (see FIG. 5) receives a frame from the link layer L2 and generates a corresponding packet (S220). The transport layer L3 (see FIG. 2) receives a frame from the link layer L2 and generates a corresponding packet (S230). An application layer determines whether the corresponding packet is output from an embedded device, based on the traffic class included in the packet (S240). When the corresponding packet is output from the embedded device, a corresponding transaction is preferentially processed (S250). When the corresponding packet is not output from the embedded device, a corresponding transaction is processed after completion of a previous transaction (S255).

According to the above-described transaction processing method of a host, a transaction may be preferentially processed based on a traffic class.

One of the storage devices 410 and 420 according to example embodiments of the inventive concepts may be an embedded storage device, and the other may be a memory card.

Figure 10:
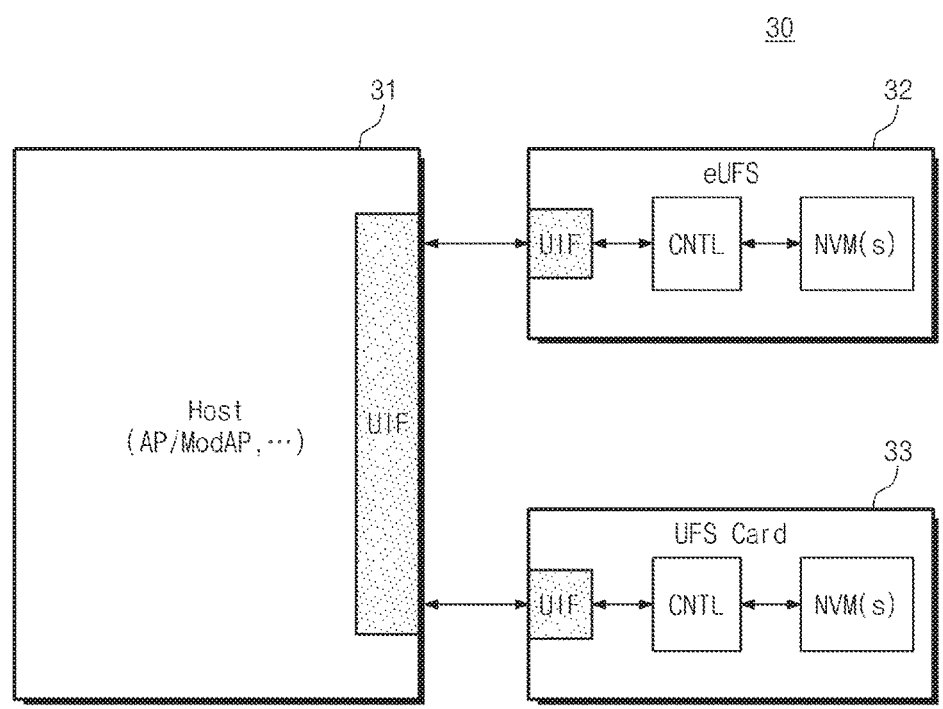
FIG. 10 illustrates an electronic device according to example embodiments of the inventive concepts.

FIG. 10 illustrates an electronic device 30 according to example embodiments of the inventive concepts. As illustrated, the electronic device 30 includes a host 31, an eUFS 32, and a UFS card 33.

The host 31 may be implemented with the host device 100 shown in FIG. 1 or the host device 300 shown in FIG. 5. The host 31 may be including but not limited to an application processor, a modem-integrated application processor, or the like. The host 31 may include an UFS interface UIF that uses the eUFS 32 and the UFS card 33 at the same time. The UFS interface UIF may be implemented to include the layers shown in FIGS. 2 to 5.

In example embodiments of the inventive concepts, the UFS interface UIC may be configured to preferentially process the eUFS 32 ahead of the UFS card 33. For example, a traffic class of the eUFS 32 and a traffic class of the UFS card 33 may be set to be different from each other, as described above. Thus, the UFS interface UIC may identify a traffic class and preferentially process the quality of service (QoS) of the eUFS 32 ahead of the QoS of the UFS card 33 according to the identified traffic class.

In example embodiments of the inventive concepts, the UFS interface UIC may divide/distinguish/classify the eUFS 32 and the UFS card 33 using a traffic class (TC) and physical port information.

The eUFS 32 is a storage device embedded in a portion of the host 31. The UFS card 33 includes an UFS interface UIF, a memory controller CNTL, and at least one nonvolatile memory device NVM(s). The UFS interface UIF may be implemented with the UFS interface shown in FIG. 6. The memory controller CNTL may control the at least one nonvolatile memory device NMV(s) according to a transaction of a host or an internal transaction.

The UFS card 33 may be removable from a socket (not shown) of the host 31. The UFS card 33 includes a UFS interface UIF1, a memory controller CNTL, and at least one nonvolatile memory device NVM(s).

The eUFS 32 and the UFS card 33 may each include at least one nonvolatile memory device NVM(s). The nonvolatile memory device may be a NAND flash memory, a vertical NAND (VNAND) flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The nonvolatile memory device may be implemented with a three-dimensional array structure. In example embodiments of the inventive concepts, a three-dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In example embodiments of the inventive concepts, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

A nonvolatile memory device according to example embodiments of the inventive concepts may be applied to not only to a flash memory device in which a charge storage layer includes a conductive floating gate but also a charge trap flash (CTF) memory device in which a charge storage layer includes an insulating layer.

Figure 11:
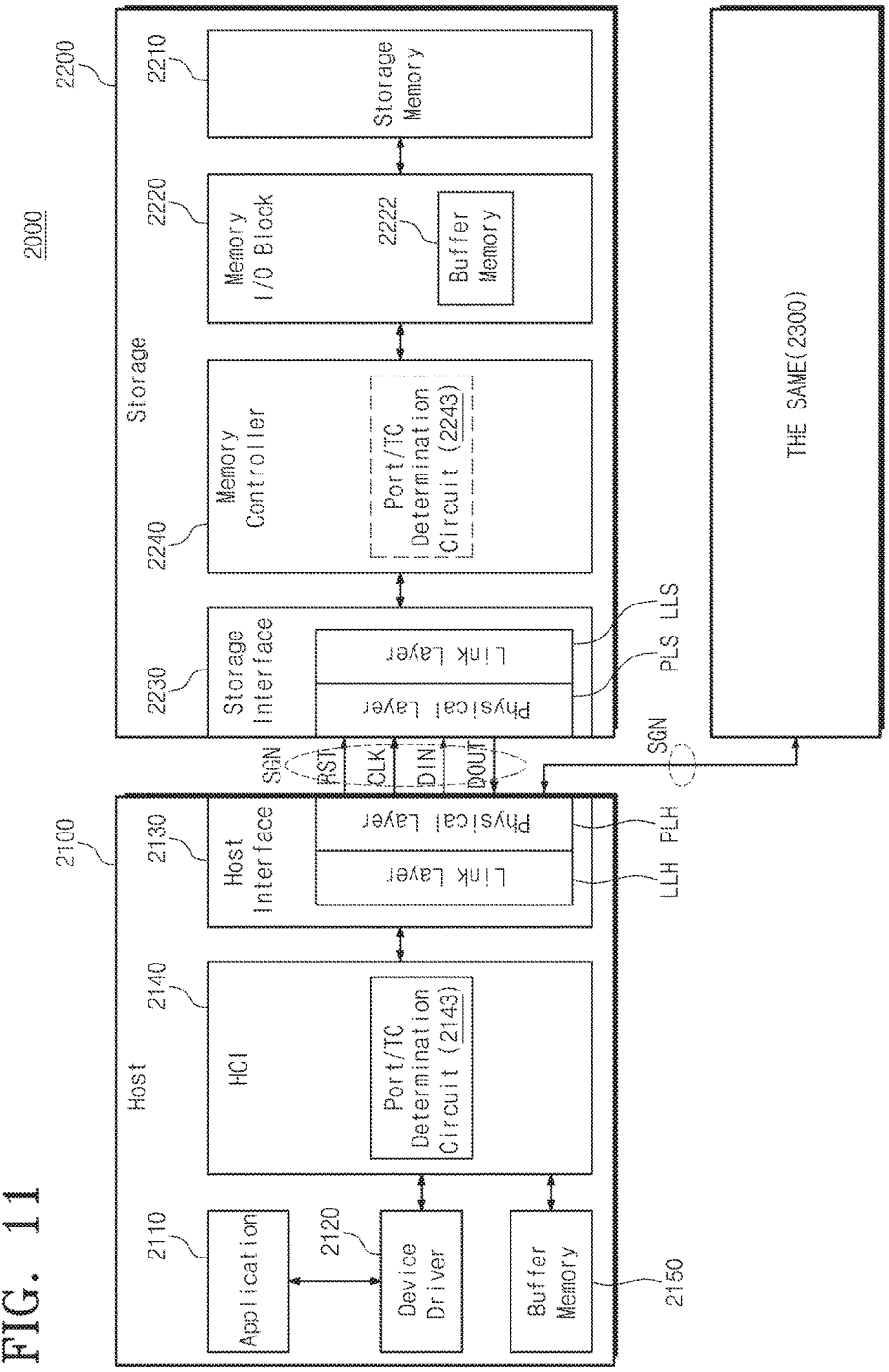
FIG. 11 is a block diagram of a storage system according to example embodiments of the inventive concepts.

FIG. 11 is a block diagram of a storage system 2000 according to example embodiments of the inventive concepts. As illustrated, the storage system 2000 may include a host 2100 and embedded/card storage devices 2200 and 2300.

The host 2100 may include an application 2110, a device driver 2120, a host interface 2130, a host controller interface 2140, and a buffer memory 2150. However, the configuration of the host 2100 as shown in FIG. 11 is merely an example embodiment for better understanding of the inventive concepts. The host 2100 may further include other components that are not shown in FIG. 11. Alternatively, the host 2100 may not include at least one of the components shown in FIG. 11.

The application 2110 may manage various types of application programs executed in the host 2100. The device driver 2120 may manage and drive peripheral devices connected to the host 2100. In example embodiments of the inventive concepts, the device driver 2120 may driver the embedded/card storage devices 2200 and 2300. The application 2110 and the device driver 2120 may be implemented with a program command, e.g., firmware.

The host interface 2130 may exchange signals (e.g., a reset signal RST, a clock signal CLK, etc.) and data (e.g., input data DIN and output data DOUT, etc.) with each of the embedded/card storage devices 2200 and 2300. The host interface 2130 may include a physical layer PLH and a link layer LLH. In example embodiments of the inventive concepts, the host interface 2130 may communicate with the embedded/card storage devices 2200 and 2300 according to an interface protocol using the physical layer PHL and the link layer LLH. The host interface 2130 may be implemented with the layers of the communication protocol described in FIGS. 1 to 7.

The host controller interface 2140 may manage and control the overall operation of the host 2100. The host controller interface 2140 may simultaneously process and manage data exchanged with the embedded/card storage devices 2200 and 2300 through the host interface 2130. The host controller interface 2140 may include a port/traffic class (Port/TC) determination circuit 2143. According to the operation of the port/traffic class determination circuit 2143, the storage devices 2200 and 2300 may be classified and their priority may be decided. The configuration shown in FIG. 11 is merely a non-limiting example embodiment for better understanding of the inventive concepts.

The buffer memory 2150 may temporarily buffer data processed by the host 2100. For example, the buffer memory 2150 may include a volatile memory such as static RAM (SRAM), dynamic RAM (DRAM), and synchronous DRAM (SDRAM) or a nonvolatile memory such as flash memory, PRAM, MRAM, ReRAM, and FRAM. The buffer memory 2150 may be omitted.

The embedded/card storage devices 2200 and 2300 may each include a storage memory device 2210, a memory input/output block 2220, a storage interface 2230, and a memory controller 2240. However, the configurations of the embedded/card storage devices 2200 and 2300 shown in FIG. 11 may be merely non-limiting example embodiments for better understanding of the inventive concepts. The embedded/card storage devices 2200 and 2300 may further include other components that are not shown in FIG. 11. Alternatively, the embedded/card storage devices 2200 and 2300 may not include at least one of the components shown in FIG. 11.

The storage memory device 2210 is a memory device configured to perform own functions of the embedded/card storage devices 2200 and 2300. The storage memory device 2210 may store data irrespective of whether power is supplied. For example, the storage memory device 2210 may be one of a NAND flash memory, a NOR flash memory, a PRAM, an MRAM, an ReRAM, and an FRAM. Alternatively, the storage memory device 2210 may include heterogeneous memories.

The memory input/output block 2220 may write data into the storage memory device 2210 and read data from the storage memory device 2210. For example, the memory input/output block 2220 may include a buffer memory 2222 to temporarily buffer data. For example, the buffer memory 2222 may include a volatile memory such as, including but not limited to, SRAM, DRAM, and SDRAM or a nonvolatile memory such as, including but not limited to, flash memory, PRAM, MRAM, ReRAM, and FRAM. Although not shown in FIG. 11, the memory input/output block 2220 may further include other components, such as an address decoder and a sense amplifier, used to input/output data.

The storage interface 2230 may exchange signals (e.g., a reset signal RST, a clock signal CLK, etc.) and data (e.g., input data DIN, output data DOUT, etc.) with the host 2100. The storage interface 2230 may include a physical layer PLS and a link layer LLS. In example embodiments of the inventive concepts, the storage interface 2230 may operate according to an interface protocol using the physical layer PLS and the link layer LLS. For example, the storage interface 2230 may be implemented with the UFS interface shown in FIG. 7.

The memory controller 2240 may manage and control the overall operation of the embedded/card storage devices 2200 and 2300. The memory controller 2240 may process and manage data exchanged with the host 2100 through the storage interface 2230.

In example embodiments of the inventive concepts, the memory controller 2240 may further include a port/traffic class (Port/TC) determination circuit 2243. The port/traffic class determination circuit 2243 may identify a transaction transmitted from another device other than the host 2100 and may decide a priority.

As illustrated in FIG. 11, the nonvolatile memory device 2241 may be implemented with a memory separate from the storage memory device 2210. However, the nonvolatile memory device 2241 and the storage memory device 2210 may be implemented with a single memory, if necessary. The configuration shown in FIG. 11 may be merely non-limiting example embodiments for better understanding of the inventive concepts.

In FIG. 11, the configurations of a host and a storage device implemented based on example embodiments of inventive concepts have been described. However, as mentioned above, example embodiments of inventive concepts may be adopted in all interface circuits using a physical layer and a link layer. FIG. 11 is not intended to limit the inventive concepts.

Figure 12:
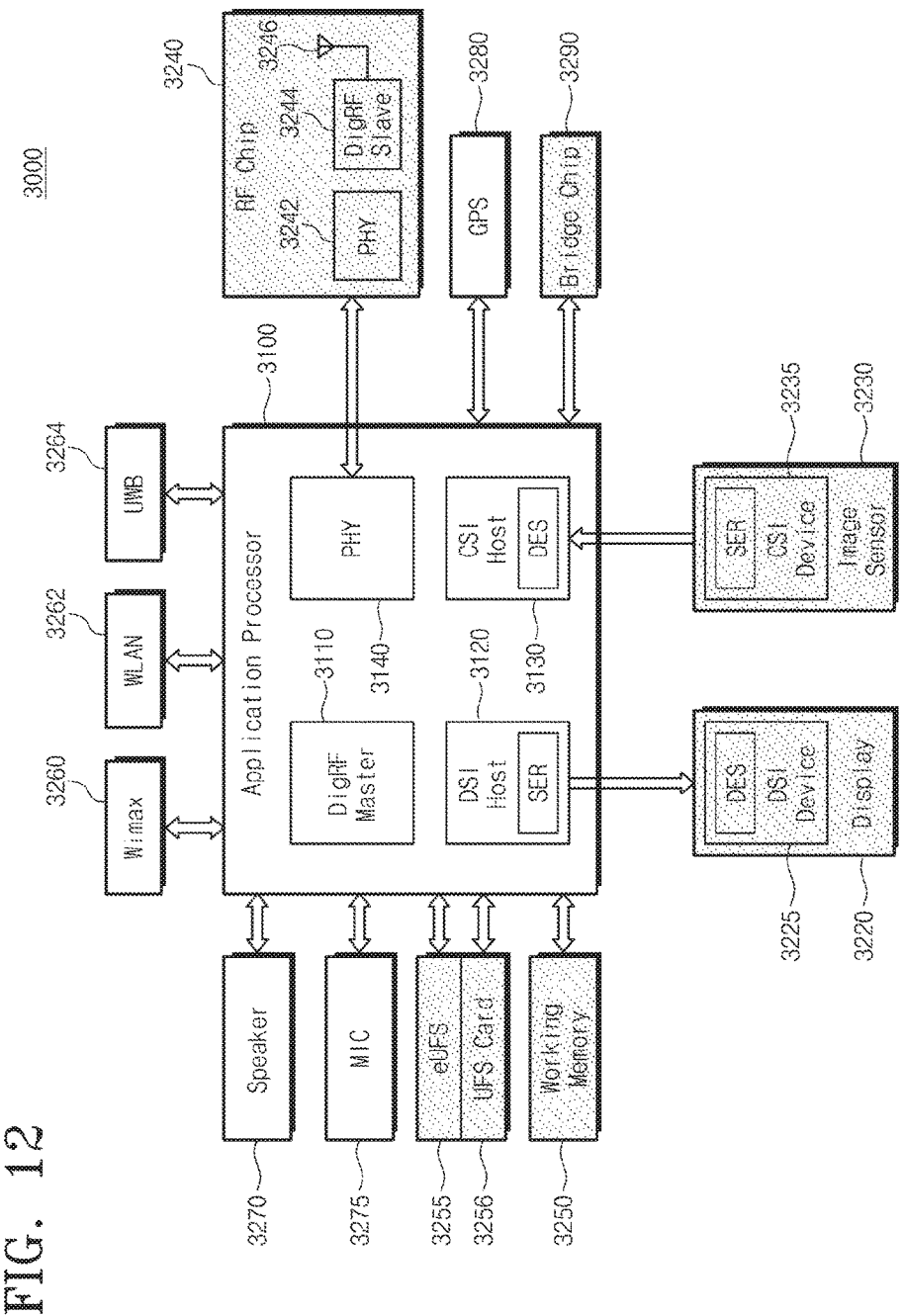
FIG. 12 is a block diagram of a mobile device according to example embodiments of the inventive concepts.

FIG. 12 is a block diagram of a mobile device 3000 according to example embodiments of inventive concepts. The mobile device 3000 may be implemented with a data processing device that may use or support an interface proposed by the MIPI Alliance. For example, the mobile device 3000 may be implemented in the form of, including but not limited to, a personal digital assistant (PDA), a portable multimedia player (PMP), a smartphone, a tablet PC or a wearable device.

The mobile device 3000 may include an application processor 3100, a display 3220, and an image sensor 3230. The application processor 3100 may include a DigRF master 3110, a display serial interface (DSI) host 3120, a camera serial interface (CSI) host 3130, and a physical layer 3140.

The DSI host 3120 may communicate with a DIS device 3225 of a display 3220 according to a DSI. For example, an optical serializer SER may be implemented in the DSI host 3120. For example, an optical deserializer DES may be implemented in the DSI device 3225.

The CSI host 3130 may communicate with a CSI device 3235 of an image sensor 3230 according to a CSI. For example, an optical deserializer DES may be implemented in the CSI host 3130. For example, an optical serializer SER may be implemented in the CSI device 3235. The DSI and the CSI may use a physical layer and a link layer.

The mobile device 3000 may further include a radio-frequency (RF) chip 3240 that communicates with the application processor 3100. The RF chip 3240 may include a physical layer 3242, a DigRF slave 3244, and an antenna 3246. For example, the physical layer 3242 of the RF chip 3140 and the physical layer 3140 of the application processor 3100 may exchange data by using a DigRF interface proposed by the MIPI Alliance.

The mobile device 3000 may further include a working memory 3250, an embedded storage device (eUFS) 3255, and a memory card (UFS card) 3256. The working memory 3250, the embedded storage device 3255, and the memory card 3256 may store data received from the application processor 3100. The working memory 3250, the embedded storage device 3255, and the memory card 3256 may provide stored data to the application processor 3100.

The working memory 3250 may temporarily store data processed or to be processed by the application processor 3100. The working memory 3250 may include a volatile memory such as, including but not limited to, SRAM, DRAM, and SDRAM or a nonvolatile memory such as, including but not limited to, flash memory, PRAM, MRAM, ReRAM, and FRAM.

The embedded storage device 3255 and the memory card 3256 may each store data irrespective of whether power is supplied. In example embodiments of the inventive concepts, the embedded storage device 3255 and the memory card 3256 may operate according to a UFS interface protocol. In particular, the embedded storage device 3255 and the memory card 3256 may each communicate with the application processor 3100 according to the configuration of a link layer described in FIGS. 1 to 10. The application processor 3100 may simultaneously control the embedded storage device 3255 and the memory card 3256 through a single UFS interface.

The mobile device 3000 may communicate with an external system through world interoperability for microwave access (Wimax) 3260, wireless local area network (WLAN) 3262, ultra wideband (UWB) 3264, and the like.

The mobile device 3000 may further include a speaker 3270 and a microphone 3275 to process voice information. The mobile device 3000 may further include a global positioning system (GPS) 3280 to process position information.

The mobile device 3000 may further include a bridge chip 3290 to manage connection to peripheral devices. In example embodiments, the bridge chip 3290 may operate based on UniPro and M-PHY interface protocols.

The mobile device 3000 may transmit and receive data between the application processor 3100 and all the devices 3220, 3230, 3240, 3250, 3255, 3256, and 3290 communicating in series according to the communication protocol described in FIGS. 1 to 4.

A memory system or a storage device according to example embodiments of inventive concepts may be packaged as one of various types to be subsequently embedded. For example, the memory system or the storage device may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

As described above, a host device according to example embodiments of the inventive concepts may include a link layer that classifies and assigns devices using physical port information or a traffic class. Thus, a chip area may not increase, and power consumption may be reduced when the devices are used at the same time.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of the example embodiments of the inventive concepts is to be determined by the broadest permissible interpretation of the following claims, and their equivalents, and shall not be restricted or limited by the foregoing detailed description. While some example embodiments of the inventive concepts have been particularly shown and described, it will be understood by one of ordinary skill in the art that variations in form and detail may be made therein without departing from the spirit and scope of the claims.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A computing system comprising:
a first storage device;
a second storage device; and
a host device configured to communicate with the first storage device and the second storage device according to a communication protocol, wherein the host device includes an interconnection layer, wherein
the interconnection layer includes a traffic class and a data link layer, wherein the data link layer is configured to generate a frame by adding physical channel information to the traffic class, and
the interconnection layer is configured to assign at least one physical port for connecting the first storage device and the second storage device to the host device, wherein the at least one physical port is configured to process transactions for the first storage device and the second storage device.

2. The computing system of claim 1, wherein the first storage device and the second storage device are homogeneous storage devices.

3. The computing system of claim 1, wherein the first storage device and the second storage device are heterogeneous storage devices.

4. The computing system of claim 1, wherein the interconnection layer is configured to assign a priority to the first storage device and the second storage device using the traffic class.

5. The computing system of claim 1, wherein the interconnection layer further includes a physical adapter layer, and the physical adapter layer is configured to receive the frame and generate a physical adapter level transaction unit by adding physical port information.

6. The computing system of claim 5, wherein the interconnection layer further includes a plurality of physical layers, and the plurality of physical layers are configured to receive the physical adapter level transaction unit and generate symbols transmittable to the first storage device and the second storage device.

7. The computing system of claim 5, wherein the communication protocol is a universal flash storage (UFS) protocol.

8. The computing system of claim 6, wherein the plurality of physical layers includes a first physical layer and a second physical layer, the first physical layer is configured to form two lanes connected to the first storage device, and the second physical layer is configured to form two lanes connected to the second storage device.

9. The computing system of claim 1, wherein the host device further includes a transport layer, and the transport layer is configured to receive the transactions from an application layer and generate a packet input using the at least one physical port to the first storage device and the second storage device.

10. The computing system of claim 9, wherein the host device further includes a network layer configured to route the packet generated at the transport layer.

11. The computing system of claim 7, wherein the first storage device is an embedded UFS (eUFS) and the second storage device is a UFS card.

12. The computing system of claim 11, wherein the host device is configured to preferentially process quality of service (QoS) of the eUFS ahead of QoS of the UFS card based on the traffic class.

13. A host device comprising:
a host controller interface configured to construct or deconstruct a transmitted or received frame into a packet; and
a universal flash storage (UFS) interface, wherein the UFS interface includes,
a UFS protocol, and
an interconnection layer, wherein the interconnection layer includes a link layer, a first physical layer, and a second physical layer, and the interconnection layer is configured to transmit or receive a frame to or from a first storage device and a second storage device,
wherein the link layer is configured to,
assign a physical port to which the first storage device and the second storage device are connected, respectively,
assign a traffic class to the packet generated from the host controller interface,
classify the first storage device and the second storage device into the first physical layer and the second physical layer, and
assign a priority to the first storage device and the second storage device based on the traffic class,
the first physical layer is configured to receive a first frame from the link layer to generate symbols transmitted or received to or from the first storage device, the first physical layer being assigned a first port number, and
the second physical layer is configured to receive a second frame from the link layer to generate symbols transmitted or received to or from the second storage device, the second physical layer being assigned a second port number different from the first port number.

14. The host device of claim 13, wherein at least one of the first storage device and the second storage device include at least one vertical NAND (VNAND) flash memory device.

15. A computing system comprising:
a plurality of storage devices, wherein each of the plurality of storage devices includes a first physical layer and a first link layer; and
a host device, wherein the host device includes an interconnection layer, a plurality of second physical layers, and a second link layer, and the interconnection layer is configured to control communication with the plurality of storage devices and the host device,
wherein the first physical layer of each of the plurality of storage devices is connected to at least one of the plurality of second physical layers of the host device via at least one port, and
the second link layer of the host device is configured to,
divide or classify the plurality of second physical layers of the host device using physical port information,
divide or classify the plurality of storage devices connected to the at least one of the plurality of second physical layers of the host device, and
assign a processing priority to each of the plurality of storage devices according to a traffic class of the plurality of storage devices.

16. The computing system of claim 15, wherein the second link layer of the host device is further configured to classify the plurality of storage devices based on physical port information and a service priority of each of the plurality of storage devices.

17. The computing system of claim 15, wherein:
the plurality of storage devices include an embedded storage device and a removable storage device; and
the host device further includes,
a transport layer, wherein the transport layer is configured to,
receive a frame from the second link layer of the host device, and
generate a packet based on the frame received; and
an application layer, wherein the application layer is configured to,
determine whether the packet generated is outputted from the embedded storage device or the removable storage device based on a traffic class included in the packet,
preferentially process a transaction in response to the packet being outputted from the embedded storage device, and
process the transaction after completion of a previous transaction in response to the packet being outputted from the removable storage device.

18. The computing system of claim 15, wherein the plurality of storage devices include at least one of a homogeneous storage device and a heterogeneous storage device.

* * * * *

UNITED STATES PATENT AND TRADEMARK OFFICE
CERTIFICATE OF CORRECTION

PATENT NO. : 10,042,783 B2  
APPLICATION NO. : 15/000243  
DATED : August 7, 2018  
INVENTOR(S) : Hyuntae Park Page 1 of 1

It is certified that error appears in the above-identified patent and that said Letters Patent is hereby corrected as shown below:

On the Title Page

Item [73], insert:  
--Samsung Electronics Co., Ltd., Gyeonggi-do (KR)--

Signed and Sealed this  
Fourth Day of December, 2018

Andrei Iancu  
*Director of the United States Patent and Trademark Office*